United States Patent [19]

Markow et al.

[11] Patent Number: 4,953,797
[45] Date of Patent: Sep. 4, 1990

[54] WOVEN CROSS-COIL WINDING SYSTEM

[75] Inventors: Paul A. Markow, Huntsville; William Nolle, Hazel Green, both of Ala.

[73] Assignee: Acustar, Inc., Troy, Mich.

[21] Appl. No.: 437,236

[22] Filed: Nov. 16, 1989

[51] Int. Cl.$^5$ ............................................. H02K 15/00
[52] U.S. Cl. ..................................... 242/7.11; 29/596; 29/605
[58] Field of Search .................. 242/7.11, 7.14, 7.05 B, 242/7.05 C, 7.09, 3; 29/596, 605

[56] References Cited

U.S. PATENT DOCUMENTS

| | | | |
|---|---|---|---|
| 3,701,489 | 10/1972 | Goldsworthy et al. | 242/7.02 X |
| 4,553,093 | 11/1985 | Chikasue | 324/169 |
| 4,633,174 | 12/1986 | Lindig et al. | 324/143 |
| 4,827,210 | 5/1989 | Lindig et al. | 324/146 |

Primary Examiner—Daniel P. Stodola
Assistant Examiner—William G. Batista, Jr.
Attorney, Agent, or Firm—Wendell K. Fredericks

[57] ABSTRACT

A cross-coil winding system for forming woven stator coil windings for an air-core gauge that has orthogonal coils with equal radii. The system employs a bobbin positioner that moves a bobbin along a path in a manner that permits forming layers of interlaced windings about the bobbin.

6 Claims, 5 Drawing Sheets

WOVEN CROSS-COIL WINDING SYSTEM

BACKGROUND OF THE INVENTION

1. Field of the Invention:

The present relates to woven air-core gauges and, more particularly, to apparatus for weaving orthogonally positioned stator coils on bobbins of aircore gauges.

2. Description of the Prior Art:

A co-pending application of Paul Markow, et al. entitled "Winding Machine For A Woven Crossed-Coil Air-Core Gauge" filed Nov. 13, 1989 as Ser. No. 02/435,214 presents a machine which holds a bobbin fixedly mounted while X and Y winding arms move in reciprocation as well as in rotation about the bobbin to effect the winding and weaving of the stator coils. In an effort to minimize the mechanical reactions and to eliminate the reciprocating action of the winding arms, a search was initiated to find improved winding techniques. That search ended in the improved winding system of the present invention.

SUMMARY OF THE INVENTION

The present invention concerns a novel apparatus for weaving stator coil windings about a bobbin to provide orthogonally positioned stator coils comprised of uniform coils disposed about the perimeter of the bobbin. The apparatus controlled by a dedicated microcomputer employs a bobbin positioner to sequentially step a centroid of the bobbin along an X axis after interlacing each cross-coil winding.

BRIEF DESCRIPTION OF THE DRAWING FIGURES

FIG. 1 is a partial block diagram, a partial schematic diagram of the winder apparatus of this invention;

FIG. 2A through K, depict stages of winder arm movement for forming the cross-coil stator windings;

FIG. 3A through K, depict movement of the step shaft of the bobbin positioner;

FIG. 4 is a flowchart illustrative of the program performed by the microcomputer for operating the system; and FIG. 5 is a depiction of an enhanced portion of the flowchart of FIG. 4.

DETAILED DESCRIPTION OF A PREFERRED EMBODIMENT

Figure 1:
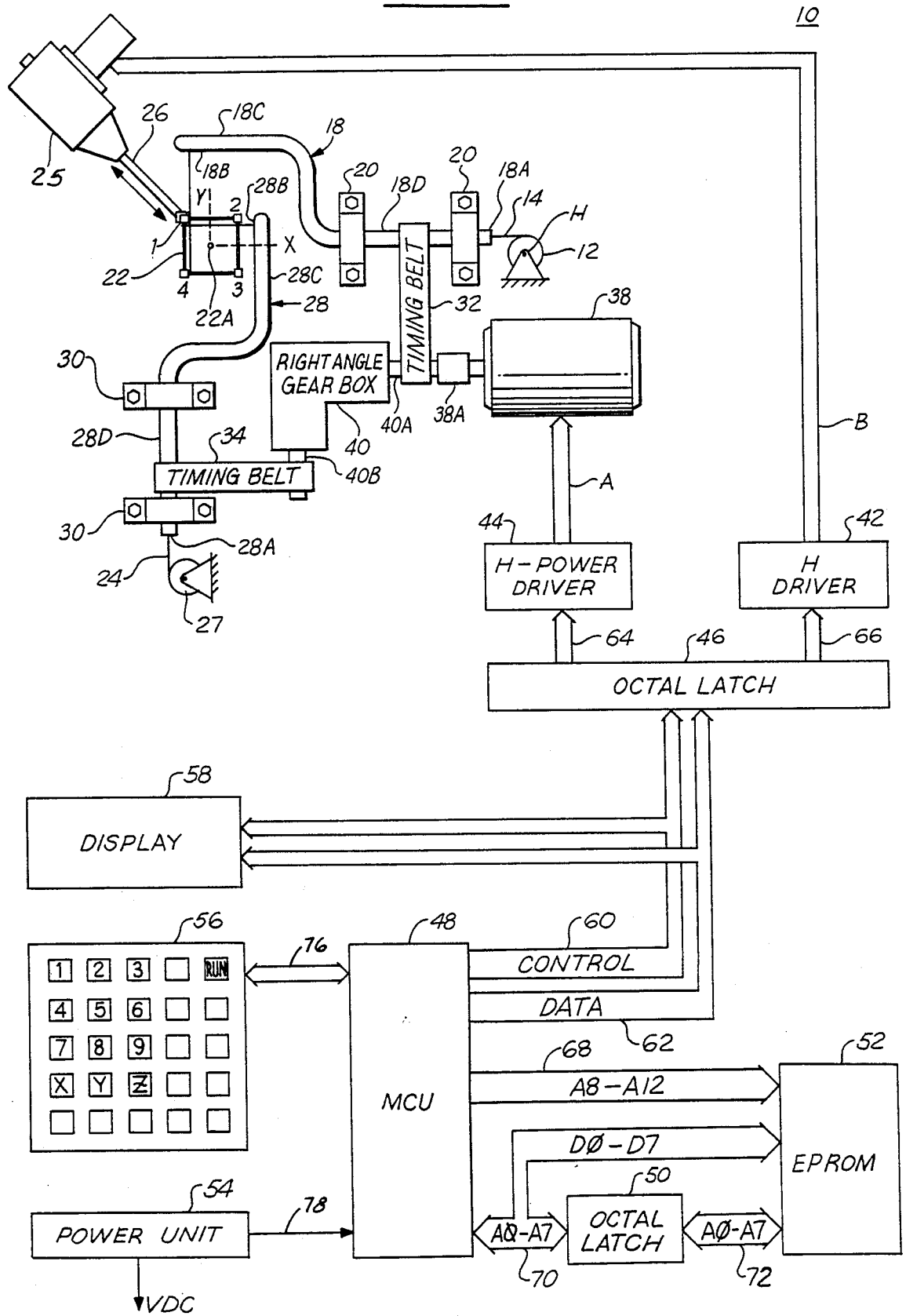
Figure 2A:
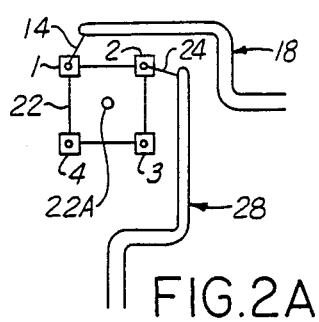
Figure 2B:
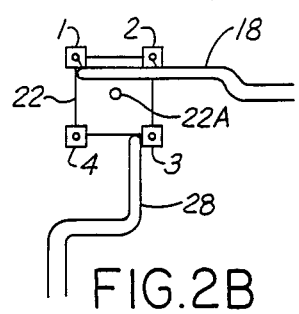
Figure 2C:
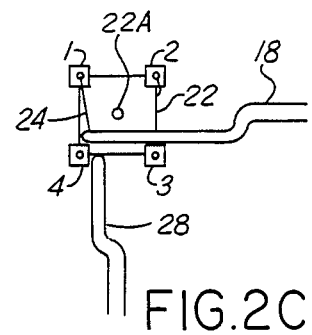
Figure 2D:
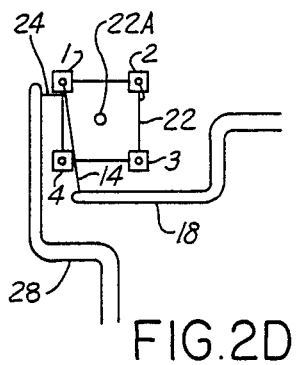
Figure 2E:
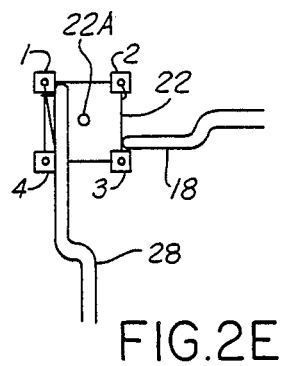
Figure 2F:
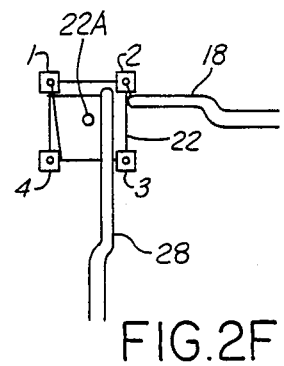
Figure 2G:
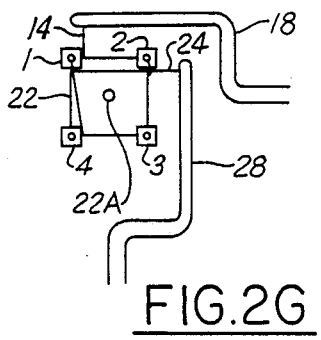
Figure 2H:
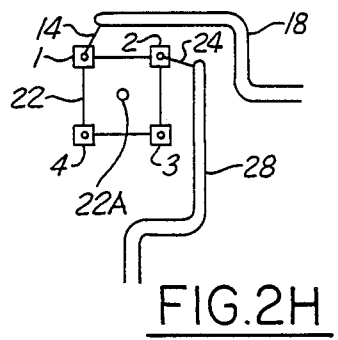
Figure 2I:
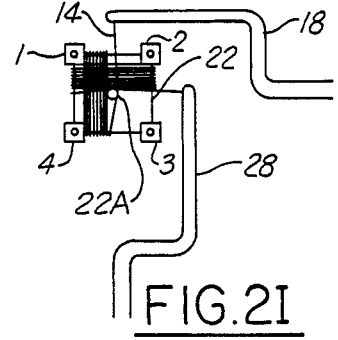
Figure 2J:
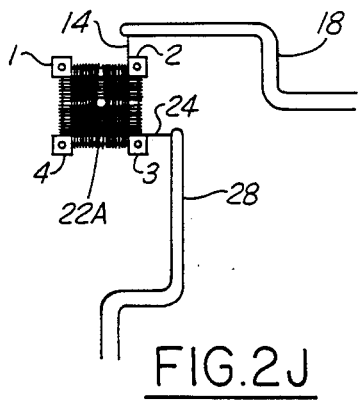
Figure 2K:
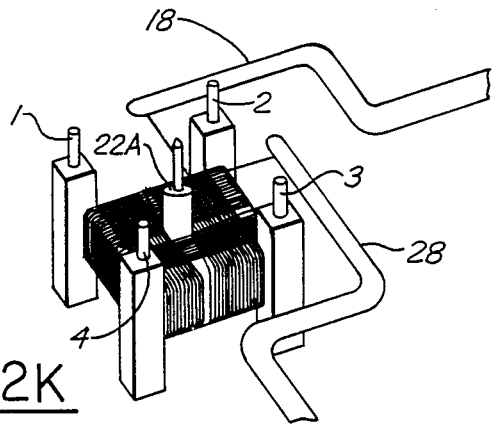

Referring now to FIG. 1, a partial block diagram, a partial schematic diagram depicts a winder apparatus 10 for interlacing the orthogonal windings of an air-core gauge. A bobbin 22 mounts to a screw-type shaft 26 of a bobbin positioner 25 such that a shaft 22A of a rotor (not shown) locates at an origin of the X and Y axis. Bobbin 22 supports the interlace windings of X and Y stator coils.

Spaced apart from bobbin 22, a reel 12, having a central axis (H) in line perpendicular to the X axis, contains a sufficient amount of wire 14 for winding the X stator coil about the X axis. Reel 12 freely rotates about the H axis for dispensing lengths of wire 14.

Wire 14, a single-strand conventional stator coil wire; e.g., a 40 gauge wire unwinds from reel 12 and enters an input port 18A of a tubular winding arm 18, exits from an output port 18B of tubular arm 18 and attaches to bobbin 22, terminal 1, for forming the X stator coil, wound about the X axis.

Tubular winding arm 18, a bent shaft, wherein one portion of the bent shaft forms an off-set arm 18C offset from another portion of the shaft which forms a rotational shaft 18D of a counterclockwise rotating, timing belt 32. The rotational shaft portion of arm 18 extends along the X axis. The off-set arm 18C of arm 18 extends parallel with the X axis between pillar blocks 20–21. The rotational shaft 18D of arm 18 contains an input port 18A for receiving wire 14, and the off-set arm 18C of winding arm 18 includes the exit port 18B used for routing the wire 14 from arm 18 to bobbin 22. Rotational shaft 18D of arm 18 rotates about the X axis under the control of timing belt 32 in the counterclockwise direction. As the shaft 18D rotates under the influence of the counterclockwise rotation timing belt 32, the off-set arm 18C rotates about an outer perimeter of bobbin 22 about the X axis in a manner for dispensing wire about bobbin 22.

Complementing the counterclockwise rotation timing belt 32, a clockwise rotation timing belt 34 causes rotations of a shaft 28D of a winding arm 28 between pillar blocks 30-14 30. Belt 34 performs the same: function as timing belt 32 but causes winding wire 24 from reel 27, which enters an input port 28A of arm 28 and exits from an output port 28B and attaches to terminal 2 ob bobbin 22, to rotate about the Y axis. Timing belt 34 and winding arm 28 are identical with arm 18 and belt 32 except for the fact that belt 34 rotates off-set arm 28C clockwise about the Y axis.

Right angle gear box 40 includes an input shaft 40A that connects to a counterclockwise rotating shaft 38A of stepper motor 38 and provides, at a right angle output shaft 40B, clockwise motion for driving timing belt 34. Box 40 causes both winding arms to perform simultaneously.

Power to the bobbin positioner 25 and to the stepper motor 38 comes from an H-driver 42 through bus A and a highpower driver 44 through bus B respectively. H-driver 42 provides a constant current signal and current direction control signals for stepping shaft 26 one step forward or backward upon completion of interlacing one X coil winding with one Y coil winding. Highpower driver 44, a conventional high-power IC driver, provides high and low control signals to stepper motor 38 to cause individual step movements of the shaft 38A of stepper motor 38 to step timing belts 32 and 34 simultaneously for each position that shaft 22A is stepped along the X axis.

An ultraviolet erasable programable read-only memory (UVEPROM) 52 stores instructions used by microcomputer (MCU) 48 for supplying logic signals used for positioning the shaft 22A of bobbin 22 along the negative X axis. While at positions along the X axis, EPROM 52 supplies instructions to MCU 48 over bus 70 and 72 to provide logic signals over bus 74 to the drivers 42 and 44 which cause the arms to wrap in interlace format an X and a Y coil winding. An individual position and an individual interlace winding instruction are stored in EPROM 52 so that each layer of the coils may be controlled.

Keyboard 56 permits operator interaction and allows the inputting of variable data over bus 76 such as: (1) the bobbin dimensions, (2) the wire gauge and diameter, the total number of windings per layer and the total number of layers.

The instructions stored in EPROM 52 includes "prompts", for the user or operator, to supply information to start and to terminate the operation. The "prompts" and the variable data appear as displays on a display unit 58.

To supply power to these electronic devices, a power unit 54 provides suitable voltage levels over line 78 to the electronic devices in system 10 as well as to the stepper motor 38 in the bobbin positioner 25.

Microcomputer 48, illustratively, is a single chip 8-bit unit such as a NECµDP7810 microcomputer containing an ALU, an on-chip clock, a ROM, a RAM, I/O ports and an 8 channel 8-bit A/D converter. The state of the port pins of MCU 48 at reset is either HIGH or LOW or a high impedance (tri-state).

Refer now to FIG. 2A through H depicts the off-set arm motion for interlacing a single winding of wire 14 about the X axis in a counterclockwise direction and one winding of wire 24 about the Y axis in a clockwise direction. The initial end of wire 14 terminates at terminal 1 while the initial end of wire 24 terminates at terminal 2. With shaft 22A at this first position along the X axis illustratively the original, stepper motor 38 steps through approximately 400 steps in order to accomplish the interlacing action depicted in FIG. 2A through H.

Part 2I of FIG. 2 illustrates the completion of half of a layer. FIG. 2J illustrates the interlacing of a complete layer while FIG. 2K illustrates the completed interlace X and Y coils. To achieve a completely interlaced X and Y coil, shaft 22A moves, illustratively, to 50 different positions. The bobbin positioner must be stepped through approximately 20 steps to change from one position to the next. The retracted or extended distance of shaft 26 for each position equals approximately 1.414 times the wire diameter.

Illustratively, a completed coil contains 1200 turns, 24 layers and the winding operation takes place in about 48 seconds or 2 seconds per layer or 35 ms per interlacing of the loops of the wires.

Figure 3A:
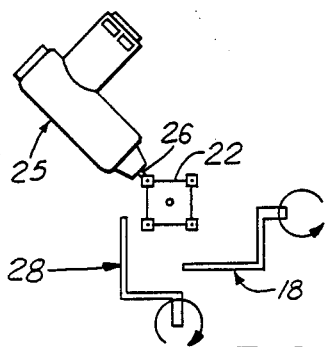
Figure 3B:
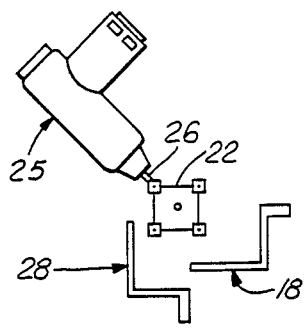
Figure 3C:
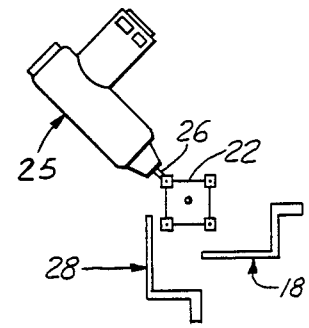
Figure 3D:
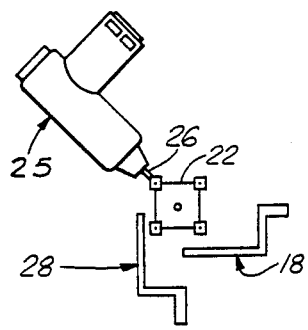
Figure 3E:
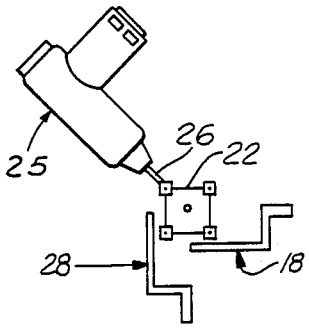
Figure 3F:
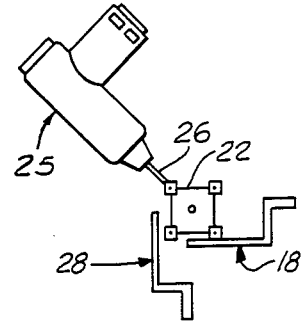
Figure 3G:
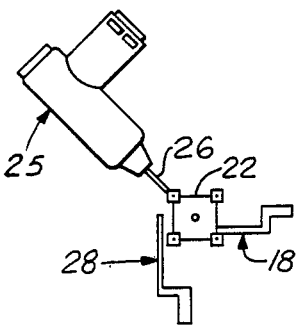
Figure 3H:
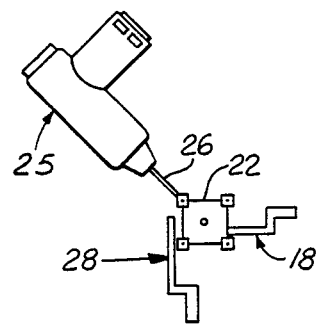
Figure 3I:
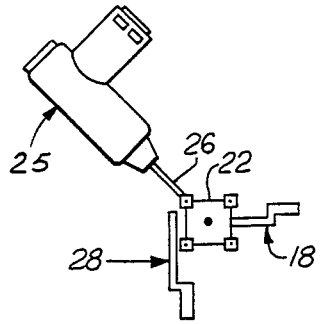
Figure 3J:
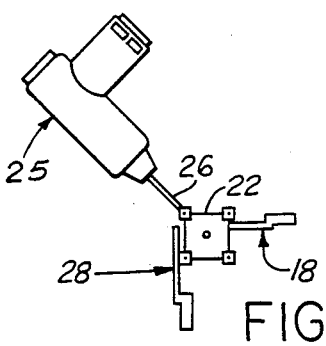
Figure 3K:
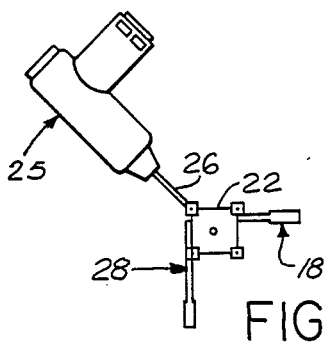

Turning now to FIG. 3, the bobbin positioner 25 is depicted in its extracted position in FIG. 3A along a 45° angle from the origin of shaft 22A to its extended position in shown in FIG. 3K. Going from the position shown in FIG. 3A to the position shown in FIG. 3K; shaft 26 is repositioned to about 50 different positions. At each position, the winding arms 18 and 28 go through the motions depicted in FIG. 2A through H.

Operation of the System

Figure 4:
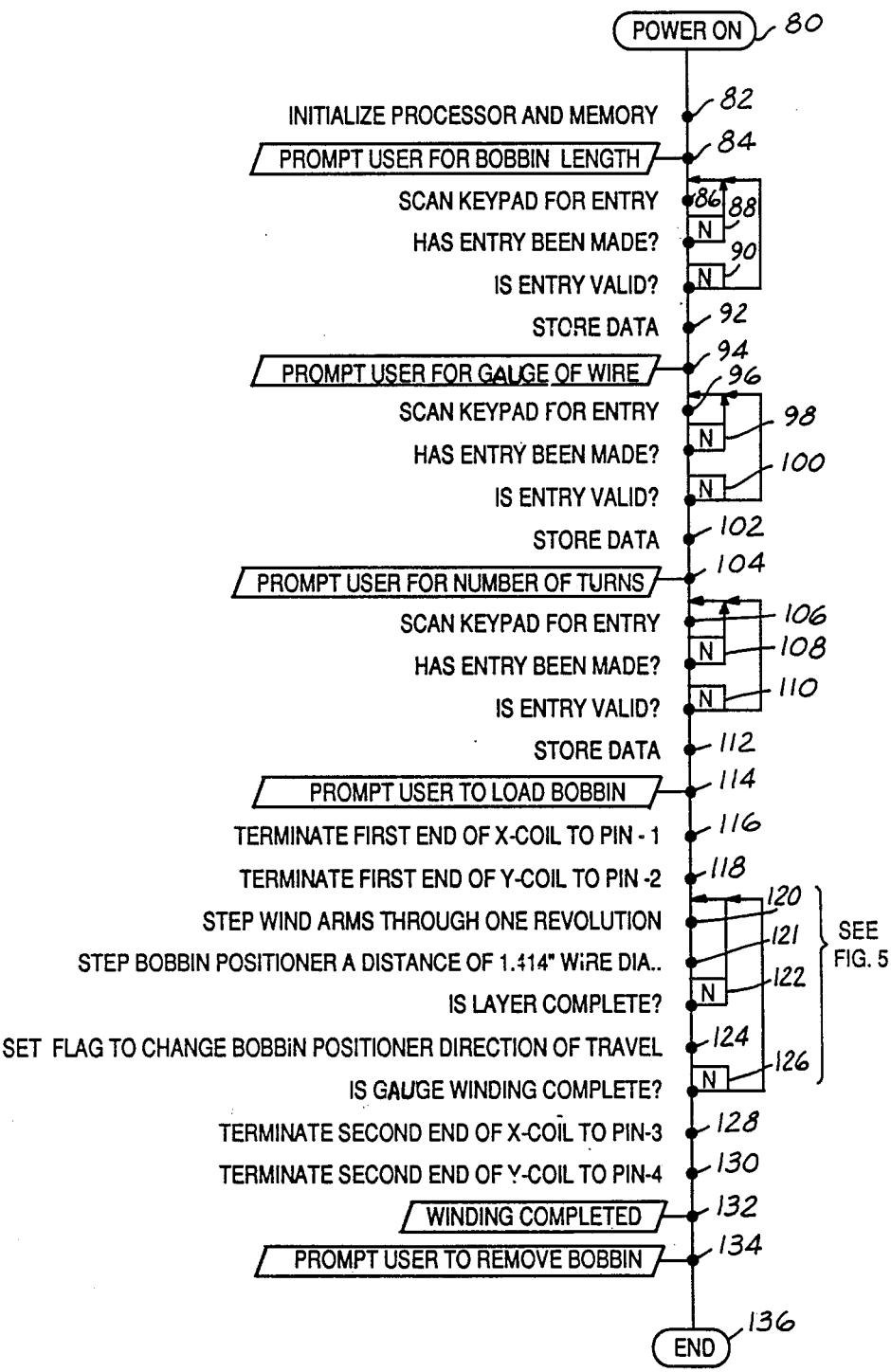
Figure 5:
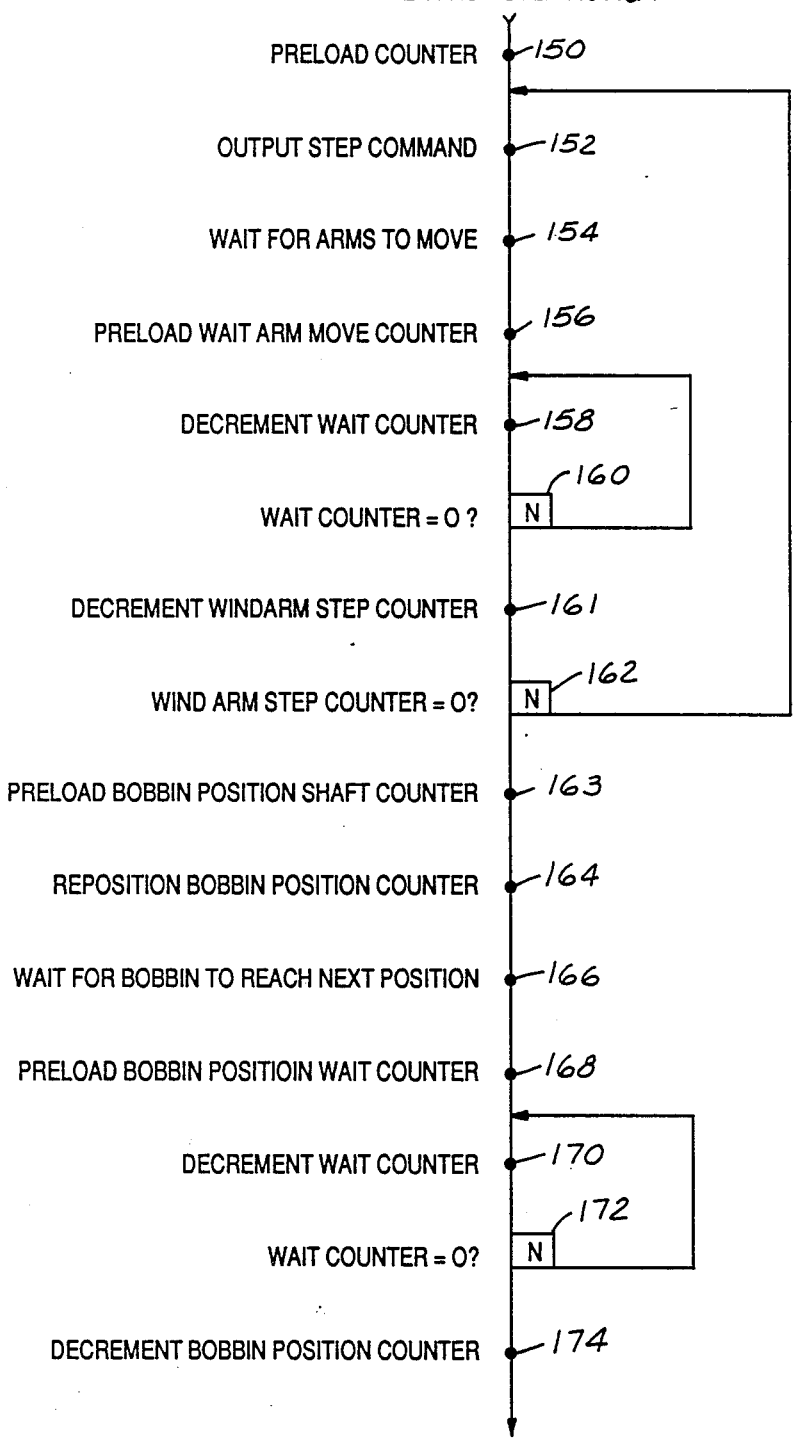

FIG. 1 and the flowcharts of FIG. 4 and 5 provide a description of the operation of winder system 10. Before describing the flowcharts, some comments are in order.

Flowchart diagrams of FIGS. 4 and 5 differs from the conventional box and diamond flowchart. In these diagrams, the flow of control passes along the lines and proceed down the page. Conventional start-up of the program and end of program elongated circle symbols are used. Actions are signified by a small circle or dot on the lines with the description of the action being given to the left or right or the flow lines. Actions only take place on vertical lines. When a decision has to be introduced, the flow line branches to the right or left. The branch may be caused by either a YES or NO condition, this being signified by a Y or N in a box as indicated. Where secondary flow rejoins the main flow, an arrowhead is used. A conventional trapezoid symbol is used to indicated input or output operations. A reference number will indicate the step along the line being discussed.

With reference to FIGS. 1 and 4, when the power is turned on (step 80) power unit 54 provides power to the electronics as well as to the stepper motor 38 and the bobbin positioner 25.

Then a preprogram initialization procedure of the register's memory in MCU 48 takes place (step 82). Afterwards, MCU 48 prompts the user by display unit 58 to supply the bobbin length (step 84). Then MCU 48 is instructed to scan the keyboard 56 for any entry (step 86). MCU 48 makes its decision as to whether or not an entry has been made (step 88). If not, the program loops back to step 84 where the user is prompted to supply the information again. If the entry is made, then MCU 48 makes another decision as to whether or not the entry is valid (step 90). If it is not valid, the program instructs MCU 48 to return to step 84. If the entry is valid, MCU 48 is instructed to store the data (step 92).

Next, MCU 48 prompts the user for the gauge of wire (step 94). Then the keyboard 56 is scanned for the entry (step 96). MCU 48 makes a decision whether or not an entry has been made (step 98). If not, it goes back to step 96 and scans the keyboard 56. If it has, then the program proceeds to cause MCU 48 to make another decision as to whether or not the gauge of wire is valid data as in decision box 100. If not, MCU 48 is instructed to return to step 96 and re-scan the keyboard 56. If the data is valid, it is stored as indicated in step 102.

MCU 48 receives instructions to prompt the user to supply the number of turns of wire to be wound (step 104). A similar loop is enacted in steps 106–112 as occurred in the prompt for the gauge of wire.

The program instructs MCU 48 to prompt the user to load bobbin 22 (step 114) which means positioning the shaft 22A of the bobbin at the origin and then connecting pin 1 to the shaft 26 of the bobbin positioner 25. Then MCU 48 is instructed to send commands to the H-driver 42 and the high-power driver 44 to cause terminating the first ends of the X and Y wire lengths 14 and 24 to pins 1 and 2 respectively as indicated in steps 116 and 118.

After terminating the first ends of wire 14 and 24, MCU 48 is instructed to step the winding arms through one revolution (step 120). During this time, stepper motor 38 causes both timing belts 32 and 34 to move the winding arms through approximately 400 steps in order to complete one revolution. Upon completion of the revolution, assuming that the shaft 26 of bobbin positioner 25 is fully extended, shaft 26 is retracted a distance equal to 1.414 times the diameter of the wire along the 45° line. MCU 48 is instructed to make a decision as to whether or not a layer has been completed as in decision box 122. If not, the program loops back to step 120 and the winding arms step an additional increment. If a layer has been completed, then the program instructs MCU 48 to set up a flag to change the direction of travel of the shaft 26 of the bobbin positioner 25 (step 124). Then MCU 48 is instructed to make another decision as to whether or not the total number of gauge windings have been completed (decision box 126). If not, the program loops back to step 120. If all the gauge windings have been completed, then MCU 48 is instructed to terminate the second end of wire 14 and wire 24 at terminals 3 and 4 respectively (steps 128 and 130). MCU 48 is then instructed to prompt the user that the winding of the stator coils is completed (step 132) and then prompts the user to remove the bobbin( step 134) and the program ends (step 136).

FIG. 5 further describes or expands the steps between 118 and 122 of FIG. 4 where each revolution of the windings occur while at a position and then upon completing each revolution the shaft 26 of the bobbin positioner is repositioned. A subprogram describing this action is depicted in FIG. 5.

In step 150, a wind arm counter in MCU 48 is preloaded to count; e.g., 400 steps (step 150). Then MCU 48 is instructed to output its first step command (step 152). MCU 48 waits for the arms to move and goes into a wait mode loop (step 154). In the wait loop, an arm movement wait counter is preloaded to a chosen value (step 156). The wait counter is decremented (step 158). MCU 48 checks to see whether or not the wait counter has reached zero as in decision block 160. If it has not reached zero, the counter is decremented again as in step 158. When the wait counter reaches 0, the wind arm step counter is decremented as indicated at step 161. Then MCU 48 makes a decision as the whether or not the wind arm step counter has reached zero as indicated in decision block 162. If not, the program loops back up to step 152 and repeats the loop. If the counter is at zero, the program proceeds to step 163 where a bobbin positioner shaft counter is preloaded as indicated at step 163. Then MCU 48 is instructed to reposition the bobbin by outputting a position command to the bobbin positioner 25 (step 164). Then MCU 48 waits for the bobbin to reach the next position (step 166). Then a wait loop is enacted as indicated in step 168, 170 and 172.

Upon completion of the wait loop, the bobbin position counter is decremented as indicated in step 174. Then the program goes back to step 122 of FIG. 4 to determine whether or not a layer has been completed.

As mentioned supra, with reference to FIG. 1, EPROM 52 stores the program containing the instructions used by MCU 48. MCU 48 pulls the instructions from memory by writing the lower 8-bits over bus 70 of each 12-bit address of the memory locations into octal latch 50 while simultaneously writing the upper 4-bits directly to EPROM 52 over bus 68 so as to select or designate this memory as the source of instructions for performing the winding operation.

Latch 50, a tri-state octal D-type latch, in this embodiment, a latch of National Semiconductor Corporation, Santa Clara, Calif., model number MM74HC373, transfers signals at the Q-outputs, the lower 8-bits of the address, over bus 72 to EPROM 52 upon receipt, at a latch enable input, of a logic high Address Latch enable (ALE) control signal (not shown) from a control signal output port of MCU 48. When the latch enable input is high, the Q outputs will follow the or D data inputs; i.e., in this case, the lower 8-bits of the address which routes over address bus 70 from an address port of MCU 48 to the D inputs of latch.

Immediately after transfer of the address bits, a logic high Read control line of MCU 48 (not shown) goes high causing the address port of MCU 48 to go to a high-impedance state to, in essence, demultiplex the address bus 70 so that bus 70 can now serve as a data bus for transferring the instructions from the addressed location in EPROM 52 back to MCU 48.

Then MCU 48 writes control commands and data commands over bus 60 and 62 respectively to another octal latch 46 which transfers the commands to H-driver 42 and high-power driver 44 to first cause the bobbin positioner 25 to position the shaft 26 to the next location along the 45 degree line to a distance 1.414 times the diameter of the wire and then after a wait interval to cause the winding arms to wrap one revolution of the wires about the bobbin.

These above sequences of MCU 48 reading instructions from EPROM 52 and writing the commands to the drivers are repeated until the completion of the winding operation.

I claim:

1. Winding system for weaving a pair of orthogonally positioned stator coils about a non-metallic, coil-bobbin, square frame, the frame having four corner post, four side walls and a central region containing a non-metallic rotor chamber housing a permanent magnet rotor, the rotor having a shaft extending from a centroid of the rotor and through a port of the chamber in the direction of the posts, the centroid being located at an origin of an X—Y coordinate axis plane with a first, second, third and fourth post (counting in a clockwise manner about the origin) positioned at a location in a quadrant bound by a positive Y and a negative X axis, a positive Y and a positive X axis, s negative Y and a positive X axis, and a negative Y and a negative X axis respectively, said system comprising:

(a) first winding means for winding a first length of wire about a perimeter of the frame in a spiral-type, counterclockwise motion from a first post in a positive X-axis direction to within the location of said second and third posts and then in a negative X-axis direction towards said first and fourth posts;

(b) second winding means coupled to said first winding means for winding a second length of wire about the perimeter of the frame in a spiral-type, clockwise motion from said second post in a negative Y-axis direction to within the location of said third and fourth posts and then in a positive Y-axis direction towards said first and third posts, said second winding means winding said second length of wire simultaneously with said first winding means winding said first length of wire such that at each revolution of the winding of the wires, said first wire interlaces with the second wire in a planes perpendicular to said bobbin shaft about a top and a lower surface of said bobbin;

(c) bobbin positioning means having a retractable shaft coupled to the first post of said bobbin for repositioning the bobbin after each revolution of the winding that interlaces the first length of wire with the second length of wire, said shaft being repositioned along a path extending 45 degrees from the origin of the X—Y axis plane in a quadrant bound by the negative X and positive Y-axis in a manner that causes the centroid of the bobbin to move in a negative X-axis direction to cause placements of interlaced first and second lengths of wire over the bobbin to form a layer of interlaced windings and thereafter to move in a positive X-direction to cause: placements of interlaced first and second lengths of wire over the layer to form another layer over the layer, the movements in the negative and positive directions along the X-axis being repeated until the stator coils are completed; and (d) computer control means coupled to said first winding means and said bobbin positioning means for providing logic control and command signals for controlling winding a revolution of the interlaced winding and for controlling repositioning the bobbin after each completion of the revolution of the interlaced winding.

2. Apparatus in accordance with claim 1 wherein said first winding means includes:
  (a) first wire dispensing reel means spaced apart from the bobbin having a central axis in line but perpendicular to the X-axis containing the first length of wire for dispensing the first length of wire in a manner for interlacement with the second length of wire;
  (b) counterclockwise rotation winding arm means including a tubular shaft bent to form a first portion that operates as a rotational shaft and another portion that operates as an off-set arm that extends parallel to the X-axis and rotates counterclockwise about an outer perimeter of the bobbin, a stepper motor including a stepper motor shaft positioned so that a counterclockwise rotating timing belt extends between the shaft portion of the tubular shaft and the shaft of the stepper motor for stepping said tubular shaft arm about the perimeter of the bobbin, said tubular shaft containing an input port for receiving the first length of wire and an output port for routing the first length of wire to the bobbin; and
  (c) power drive means for providing current signals to said stepper motor in response to logic command and control signals from said computer control means.

3. Apparatus in accordance with claim 2 wherein said second winding means includes;
  (a) second wire dispensing reel means spaced apart from the bobbin having a central axis in line but perpendicular to the Y-axis containing the second length of wire for dispensing the second length of wire in a manner for interlacement with the first length of wire;
  (b) clockwise rotation winding arm means including another tubular shaft bent to form a first portion that operates as a rotational shaft and another portion that operates as an off-set arm that extends parallel to the Y-axis and rotates clockwise about an outer perimeter of the bobbin, a right-angle gear means having a shaft extending so that a clockwise rotating timing belt extends between the shaft portion of the tubular shaft and the shaft of the right-angle gear means for stepping said tubular shaft arm about the perimeter of the bobbin, said tubular shaft containing an input port for receiving the first length of wire and an output port for routing the first length of wire to the bobbin, said right-angle gear means causing said another tubular shaft to rotate simultaneously with the tubular shaft of the first winding means.

4. Apparatus in accordance with claim 3 wherein said bobbin positioning means is a stepper motor containing a screw type-shaft that extends in response to current signals in a first direction and retracts in response to current signals in a second direction, said bobbin positioning means also including an H-driver means for providing a drive current signal to the stepper motor and for controlling the direction of the drive current signal in response to logic control and command signals from said computer control means.

5. Apparatus in accordance with claim 4 wherein said computer control means includes:
  (a) keyboard means for enabling an operator to input data and control signal information;
  (b) display means;
  (c) EPROM means for storing instructions for controlling the winding operation;
  (d) first latch means for transferring address commands to said EPROM in order to pull instruction data stored in said EPROM means;
  (e) second latch means for transferring control and command signals to said H-driver and said high power driver
  (f) first bus means coupled between said first latch means and said EPROM means for transferring address command to and instruction data from said EPROM;
  (g) second bus means coupled between said second latch means and said H-driver and said high power driver for transferring control and command signals to the drivers;
  (h) means for addressing locations in said EPROM means to pull instruction data from EPROM locations;
  (i) means for determining a number steps for stepping the stepper motor of said first winding means for causing the interlacing for each revolution of said first and second lengths of wire;
  (j) means for determining the number of steps the stepper motor of said bobbin positioning means must step to reposition the bobbin after revolution of said first and second lengths of wire;
  (k) power means coupled to said high-power and H-driver means for supplying input power;
  (l) means for computing the current routed to said high power means and the current and direction of current routed to said H-driver means; and
  (m) command and control signal means for providing command and control signals to said high power and H-drivers.

6. Apparatus in accordance with claim 5 wherein said computer means is a microcomputer means connected to said first and second buses, wherein said EPROM addressing means, said bobbin positioning step determining means, said first winding step determining means, said current signal and direction computing means and said command and control signal means are microcomputer instructions in firmware of said microcomputer means.

* * * * *